W. M. BALL.
Cultivator.
No. 63,830. Patented Apr. 16, 1867.
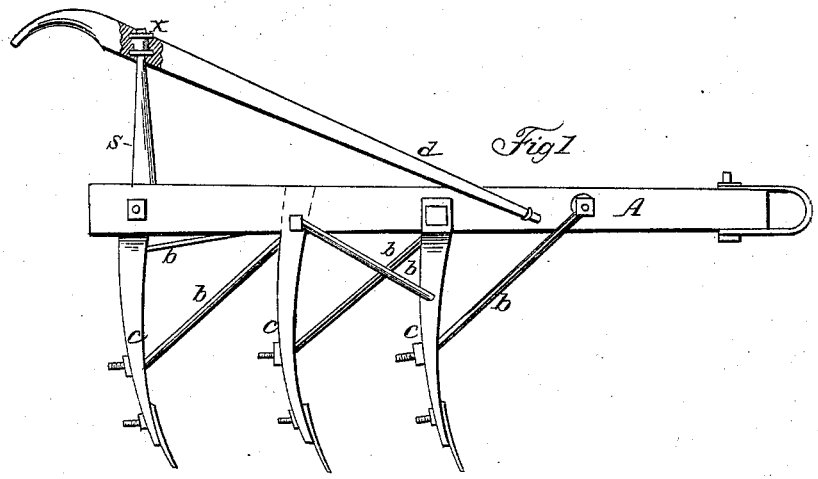
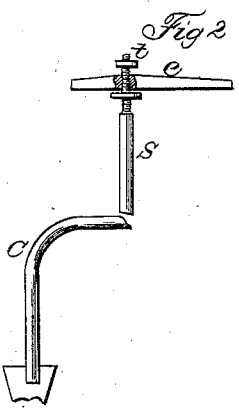
WITNESSES:
F. Lehmann
A. B. Yeatman
INVENTOR:
Wm M Ball
per
J H Alexander & Co
Attorneys

United States Patent Office.

WILLIAM M. BALL, OF MORRISTOWN, INDIANA.

Letters Patent No. 63,830, dated April 16, 1867.

IMPROVEMENT IN CULTIVATORS.

*The Schedule referred to in these Letters Patent and making part of the same.*

TO ALL WHOM IT MAY CONCERN:

Be it known that I, WILLIAM M. BALL, of Morristown, Shelby county, in the State of Indiana, have invented certain new and useful improvements in Cultivators; and I hereby declare that the following is a true, full, and exact description of the same, reference being had to the accompanying drawings, and to the letters of reference marked thereon.

In the annexed drawings, which make a part of this specification—

Figure 1 gives a side view of my cultivator.

Figure 2 is a front view of the hindmost standard.

My cultivator consists of beam A and handles $d$, which are constructed in a manner similar to those in common use. C represents the standards, to which the shovels are attached. The middle standard C is let into the beam A at top, and firmly secured in position by an iron screw-bolt. The front standard C is bolted to the side of the beam A, and then curves outward sufficiently far to throw the descending shank, to which the shovel is attached, as far to the right of the middle standard as is required. The rear standard C is placed on the opposite side of the beam from front standard C, and is curved in a similar manner in order to throw the shovel attachment as far to the left of the middle standard C as the front standard is to the right. The front and rear standards are braced to the beam A by iron rods $b$, the upper end of said rods being bolted to the side of the beam A, and the lower ends, after passing through their respective standards, are secured by a nut. The middle standard C is braced by a single rod in the manner above described. The rear standard has an extension or arm, S, reaching upwards and penetrating the round or bar $e$, which binds the plough handles together. A screw-thread is cut on the end of said arm S, and upon this screw two nuts are adjusted, one nut being above the bar $e$, (see fig. 2,) and the other below it. By the arrangement of these nuts the handles $d$ can be raised or lowered so as to suit the height of the ploughman.

Having thus described my invention, what I claim, and desire to secure by Letters Patent, is—

1. The arm S, provided with screw-thread and nuts $t$, as described, in combination with bar $e$, for the purpose herein specified.

2. The arm S, provided with screw-thread and nuts $t$, the bar $e$, handle $d$, standards C C C, braces $b\ b\ b$, and beam A, when the whole are combined, arranged, and operating in the manner and for the purpose substantially as herein set forth.

In testimony whereof I set my hand in presence of two witnesses.

WILLIAM M. BALL.

Witnesses:
O. F. FITCH,
S. A. COLLINS.